United States Patent [19]

Murakami et al.

[11] Patent Number: 4,457,257
[45] Date of Patent: Jul. 3, 1984

[54] DEVELOPING DEVICE

[75] Inventors: Reiji Murakami, Yokohama; Shinichi Hashimoto, Fujisawa; Yoshiaki Tamura, Kawasaki, all of Japan

[73] Assignee: Tokyo Shibaura Denki Kabushiki Kaisha, Kawasaki, Japan

[21] Appl. No.: 517,744

[22] Filed: Jul. 27, 1983

[30] Foreign Application Priority Data

Jul. 30, 1982 [JP] Japan .................. 57-133564

[51] Int. Cl.³ .................. G03G 15/09; G03G 21/00
[52] U.S. Cl. .................. 118/652; 118/657; 118/658; 355/15
[58] Field of Search .................. 118/652, 657, 658; 430/125; 355/3 DD, 15

[56] References Cited

U.S. PATENT DOCUMENTS 3,631,838  1/1972  Kushima et al. .................. 118/657
3,659,311  5/1972  Waren .................. 15/256.5

FOREIGN PATENT DOCUMENTS 5614268  7/1979  Japan.
56-137380  10/1981  Japan .................. 355/15

OTHER PUBLICATIONS

Liebman, A. J. and Nye, L. M., *Contactless Metering of Magnetic Toner*, Xerox Disclosure Journal, vol. 2, No. 5, Sep./Oct. 1977, pp. 49-50.

*Primary Examiner*—Evan K. Lawrence
*Attorney, Agent, or Firm*—Cushman, Darby & Cushman

[57] ABSTRACT

In a developing device, a developing roller is disposed at a fixed position to oppose an electrostatic latent image-forming surface rotating in one direction, and a submagnet roller is disposed to be parallel to the electrostatic latent image-forming surface, to have an axis perpendicular to the one direction, and to oppose the developed area opposing the developing roller at a downstream side from the developing roller along the one direction. The developing roller supplies a magnetic developing agent by a magnetic force to that portion of an electrostatic latent image which opposes the developing roller and is defined as a developed area to develop the electrostatic latent image in the developed area by the magnetic developing agent. The submagnet roller has a plurality of segments such that different magnetic poles thereof alternately appear along the axis of the submagnet roller to remove unnecessary particles of the magnetic developing agent which are deposited on that portion of the image-forming surface on which the electrostatic latent image has been developed by the developing roller.

19 Claims, 22 Drawing Figures

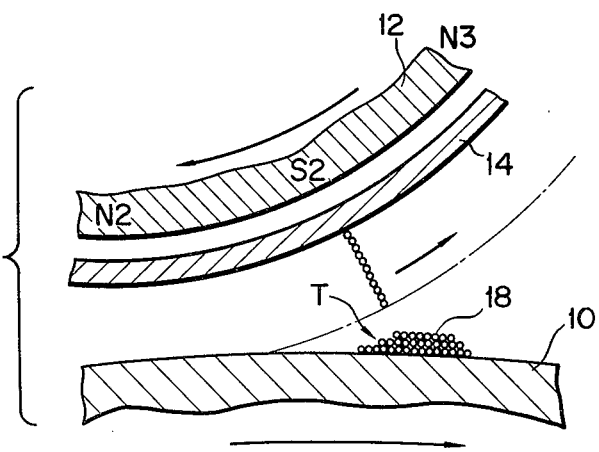
FIG. 7C
PRIOR ART
FIG. 8
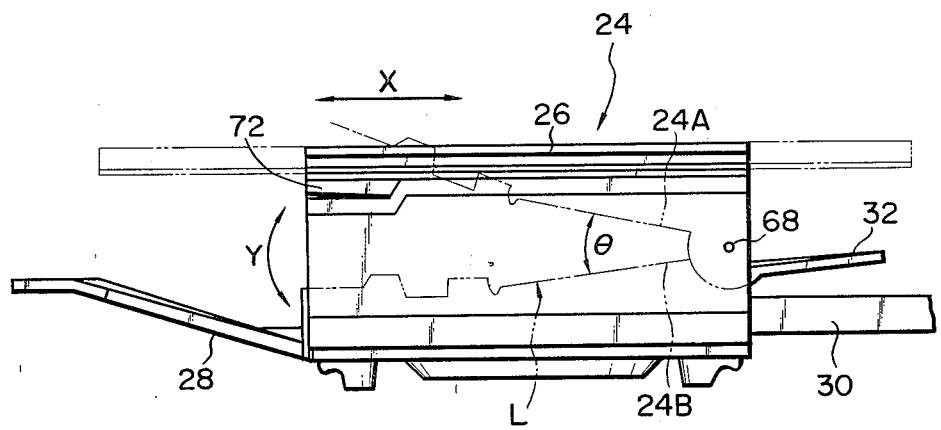

DEVELOPING DEVICE

BACKGROUND OF THE INVENTION

The present invention relates to a developing device for developing an electrostatic latent image formed on an image-forming surface and, more particularly, to a developing device for developing the electrostatic latent image by a magnetic developing agent.

In a developing process of an electrophotographic apparatus, a magnetic brush developing device using a single-component magnetic toner as a magnetic developing agent has been recently used.

A typical example is illustrated in FIG. 1. A developing roller 16 comprises a magnet roller 12 having a plurality of magnetic poles and a cylindrical sleeve 14 surrounding the magnet roller 12. The developing roller 16 is disposed opposing an electrostatic latent image-forming surface (surface to be developed) 10 of a photosensitive drum or image carrier, as shown in FIG. 1.

In the developing device of this type, a magnetic brush 20 of a magnetic toner 18 is formed on an outer surface of the cylindrical sleeve 14 by rotating the magnet roller 12 and the cylindrical sleeve 14 in opposite directions (clockwise and counterclockwise, respectively, as indicated by arrows in FIG. 1); rotating the magnet roller 12 and the cylindrical sleeve 14 in the same direction to form the magnetic brush 20 thereon, as shown in FIGS. 2 or 3; or rotating only the magnet roller 12. The magnetic brush 20 is controlled by a doctor blade 22 so as to have a uniform thickness and is brought into slidable contact with the electrostatic latent image-forming surface 10.

In a developing device of another type, as shown in FIG. 4, a stationary magnet roller 12' is used, while a cylindrical sleeve 14 is rotated to develop an electrostatic latent image.

These conventional developing devices can provide relatively good images. However, the following problems remain unsolved. In the device shown in FIG. 1, the most balanced image can be obtained. However, the magnetic toner 18 which is deposited on or is about to be deposited on the electrostatic latent image-forming surface 10 rotates upon rotation of the magnetic poles. For this reason, it is found that an image defect phenomenon called "trail" occurs at the trailing or leading end of a solid image portion S having a great amount of toner. The trail phenomenon appears like a comet tail at a trailing end of the solid image portion S of a copying paper sheet P in the direction of conveyance, as indicated by reference symbol T, in FIG. 5.

The mechanism of the trail phenomenon will be described with reference to FIG. 6 and FIGS. 7A to 7C. FIG. 6 shows rotation of the magnet roller 12 and corresponding movement of the magnetic toner 18. When the magnet roller 12 rotates in the direction indicated by arrow A, the magnetic toner 18 on the sleeve 14 moves in the direction indicated by arrow B. The magnetic toner 18 deposited on part of the electrostatic latent image-forming surface 10 opposing the sleeve 14 rotates by itself and moves in the direction indicated by arrow C (i.e., the toner itself rotates and moves in the same direction as the magnet roller 12).

The trail phenomenon occurs due to movement of the toner in the direction indicated by arrow C. The mechanism of the trail phenomenon is illustrated in FIGS. 7A to 7C. As shown in FIG. 7A, a toner chain 18' is cut off by an electrostatic attraction force of the electrostatic latent image-forming surface 10 and the magnetic force of the magnet roller 12. Several particles of the magnetic toner 18 which are located at the distal end of the cut toner chain are deposited on the electrostatic latent image-forming surface 10. These toner particles are moved in the same direction as the magnet roller 12 rotates (i.e., in the direction opposite to the rotational direction of the electrostatic latent image-forming surface 10), as shown in FIG. 7B. By this movement, as shown in FIG. 7C, part of the toner at the trailing end of the image is deposited at a prospective image-forming portion, thereby effecting the trail phenomenon. The trailed toner particles tend to roll to any other area outside the image-forming portion due to a low potential at this area.

The basic mechanism of the trail phenomenon has thus been described. Another cause of trailing is non-charged toner mixing. Non-charged toner particles tend to receive the influence of the magnet since the attraction force of the photosensitive drum is decreased. For this reason, trailing is typically observed immediately after the toner is replenished. When copying is repeated after the toner is replenished, trailing tends not to occur. Therefore, it is assumed that this phenomenon is partially caused by non-charged toner particles.

SUMMARY OF THE INVENTION

The present invention has been made in consideration of the above situation and has for its object to provide a simple developing device for preventing trail phenomenon.

According to the present invention, there is provided a developing device which is opposing a developing area of an electrostatic latent image-forming surface, for conveying a magnetic developing agent by a magnetic force and for transferring the magnetic developing agent to the electrostatic latent image-forming surface, wherein a magnetic member opposes the electrostatic latent image-forming surface past the developing area so as to remove unnecessary developing particles on the electrostatic latent image-forming surface. The magnetic member has an axis parallel to the electrostatic latent image-forming surface, and perpendicular to a feed direction of the electrostatic latent image-forming surface, and has a plurality of segments such that the two magnetic poles appear alternately along the axis.

BRIEF DESCRIPTION OF THE DRAWINGS

FIG. 6 and FIGS. 7A to 7C are sectional views for explaining the mechanism by which trailing occurs;

FIG. 8 is a front view schematically showing an electronic copying machine which has a developing device of the present invention;

DETAILED DESCRIPTION OF THE PREFERRED EMBODIMENTS

A developing device according to a first embodiment of the present invention will be described in detail with reference to FIGS. 8 to 12.

Figure 1:
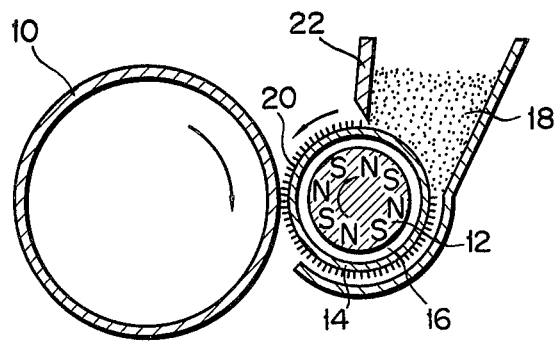
FIG. 1 is a sectional view schematically showing a conventional developing device.
Figure 2:
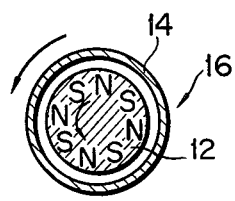
FIGS. 2 to 4 are sectional views showing various conventional developing rollers, respectively.
Figure 3:
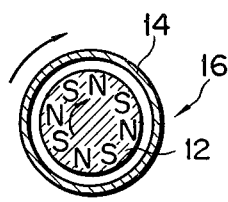
Figure 4:
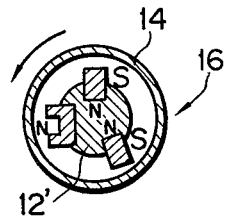
Figure 5:
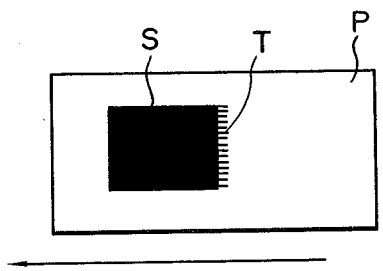
FIG. 5 is a plan view of a copied paper sheet showing the disadvantages when conventional developing devices are used.
Figure 6:
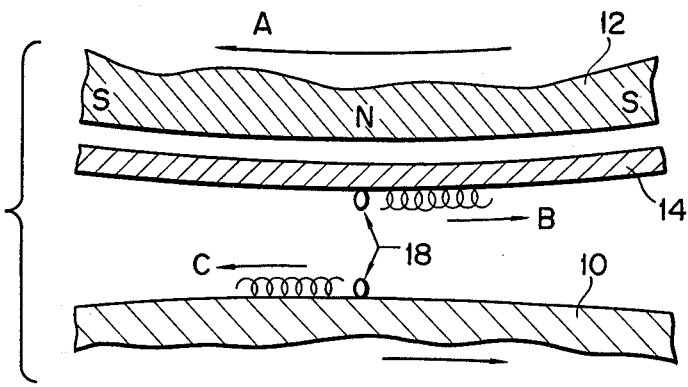
Figure 7A:
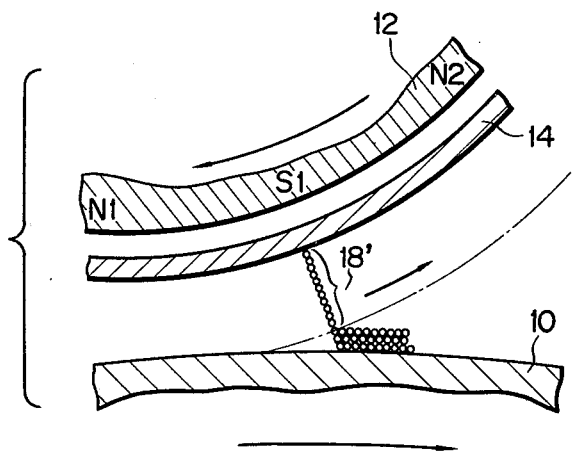
Figure 7B:
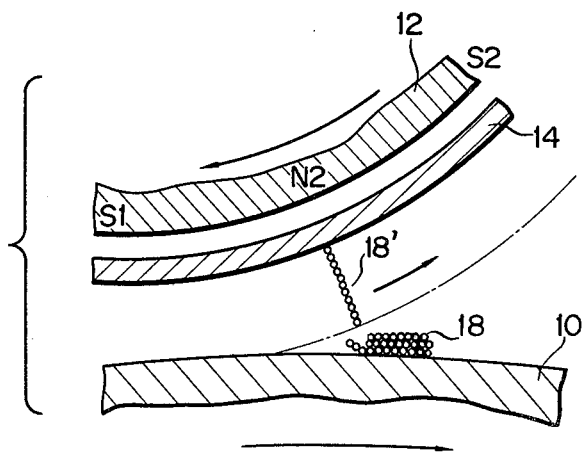
Figure 9:
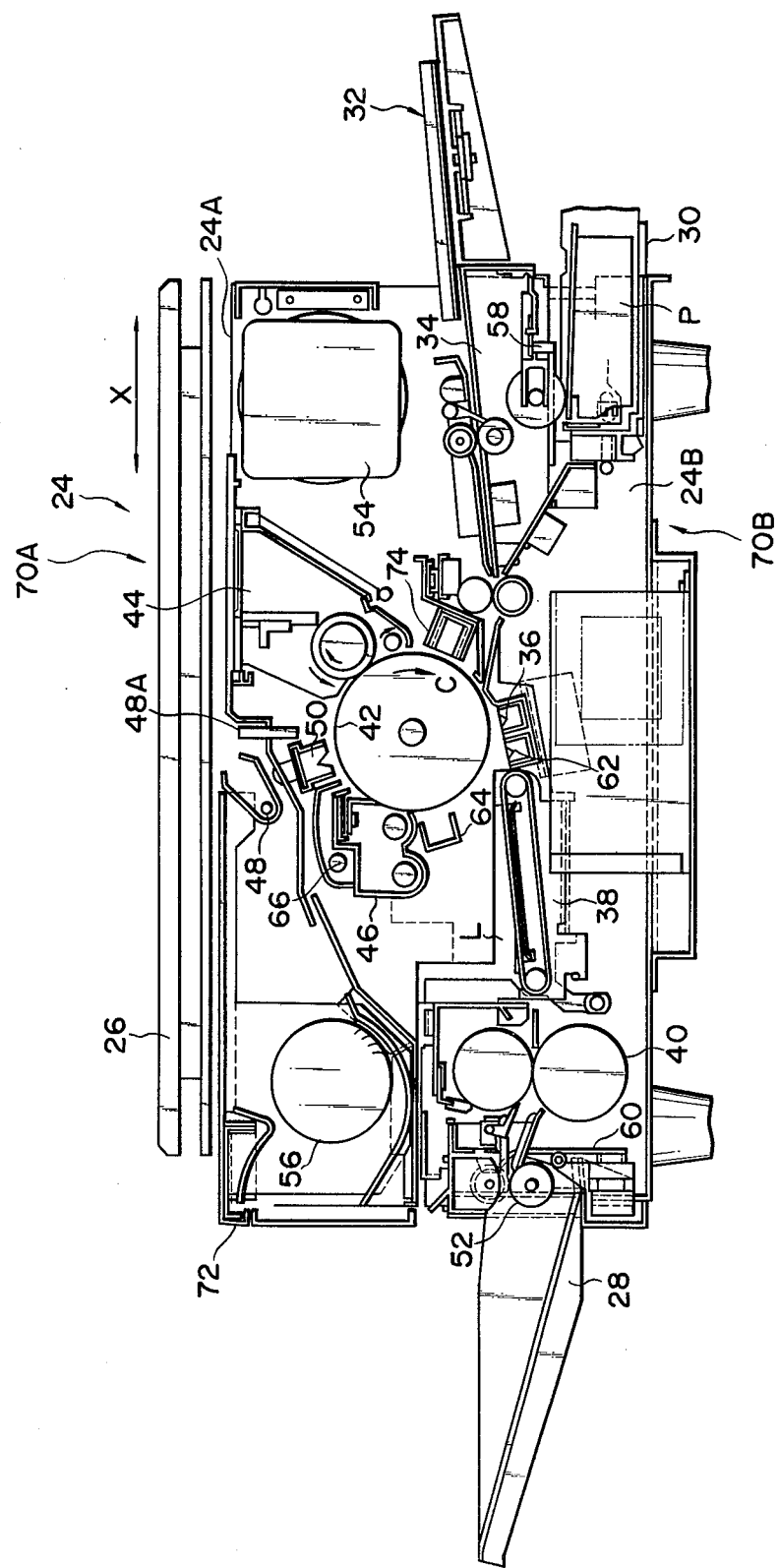
FIG. 9 is a side view schematically showing the internal structure of the electronic copying machine shown in FIG. 8.

Referring to FIG. 8, reference numeral 24 denotes a copying machine housing. A document table 26 is placed on the housing 24 and can reciprocate in the directions indicated by arrow X as needed. A discharge tray 28 is detachably mounted on the left-hand side of the housing 24. A cassette 30 for storing copying paper sheets P therein and a manual guide member 32 are detachably mounted on the right-hand side of the housing 24. As shown in FIG. 9, in the housing 24 a paper feed mechanism 34, a transfer mechanism 36, a conveyor mechanism 38, a fixing mechanism 40, a photosensitive drum or image carrier 42, a developing device 44 as the principle feature of the present invention, a cleaning device 46, an illumination system 48, a charger 50, a conveyor roller 52 and a motor 54 are received. The paper feed mechanism 34 feeds the copying paper sheets P supplied through the cassette 30 or the manual guide member 32. The transfer mechanism 36 transfers a magnetic toner which forms a developed toner image on the photosensitive drum 42 to each copying paper sheet P. The conveyor mechanism 38 conveys the copying paper sheet P to which the toner image is transferred. The fixing mechanism 40 fixes the toner image on the copying paper sheet P. The photosensitive drum 42 has an electrostatic latent image-forming surface made of a selenium photosensitive layer on the outer circumferential surface thereof. It rotates along the direction indicated by arrow C. The developing device 44 develops the electrostatic latent image formed on the electrostatic latent image-forming layer of the photosensitive drum 42. The cleaning device 46 removes the remaining toner particles from the electrostatic latent image-forming layer. The illumination system 48 illuminates a document placed on the document table 26. The charger 50 charges the electrostatic latent image-forming layer of the photosensitive drum 42. The conveyor roller 52 conveys the fixed copied paper sheet P to the discharge tray 28. The motor 54 is driven to periodically move the document table 26 and rotate the photosensitive drum 42. Furthermore, in the housing 24 a cooling device 56 is provided on the side so as to cool the heating portion. A paper empty detector 58 is disposed above the cassette 30. A jamming detector 60 (e.g., microswitch) is disposed to the left of the fixing mechanism 40 in FIG. 9. Note that reference numeral 62 in FIG. 9 denotes a paper separator; 64, a discharger; and 66, a precharging exposure lamp.

The housing 24 comprises a upper frame 24A and a lower frame 24B which are pivotal about one end 68 (FIG. 8) thereof. Therefore, the frames 24A and 24B can be opened at the other end of the housing 24 to a desired angle $\theta$ (e.g., 25°). The photosensitive drum 42, cleaning device 46, developing device 44 and document table 26 are mounted by proper means in the upper frame 24A, thereby constituting an upper unit 70A. The cassette 30, transfer mechanism 36, fixing mechanism 40, and discharge tray 28 are mounted by proper means in the lower frame 24B, thereby constituting a lower unit 70B. The operator can pivot and remove an operation panel 72 and can pivot the upper frame 24A by a housing opening/closing mechanism (not shown) in the direction indicated by arrow Y with respect to a conveyance path L of the copying paper sheet P, thereby exposing the upper surface of the lower frame 24B.

In the electronic copying apparatus having the structure described above, a document on the document table 26 is illuminated by the illumination system 48. Light reflected by the document is focused on the electrostatic latent image-forming layer of the photosensitive drum 42 by a light-converging member 48A. Thereafter, each copying paper sheet P picked up from the cassette 30 or inserted through the manual guide member 32 is guided to a position below the photosensitive drum 42. The electrostatic latent image is developed by the magnetic toner in the developing device 44 and becomes a visible or toner image. This toner image is transferred to the copying paper sheet P conveyed thereto by the conveyor mechanism 38.

A pretransfer discharger 74 is disposed between the developing device 44 and the transfer mechanism 36. The pretransfer discharger 74 serves to increase the transfer efficiency and the separating efficiency of the copying paper sheet P to and from the photosensitive drum 42. The transferred sheet P is guided to the fixing mechanism 40 through the conveyor mechanism 38 and is fixed. Thereafter, the fixed sheet P is discharged to the discharge tray 28 through the conveyor roller 52. Note that the photosensitive drum 42 is cleaned by the discharger 64 and cleaning mechanism 46 after image transfer is completed, and that a predetermined portion of the photosensitive drum 42 opposes the charger 50.

Figure 10:
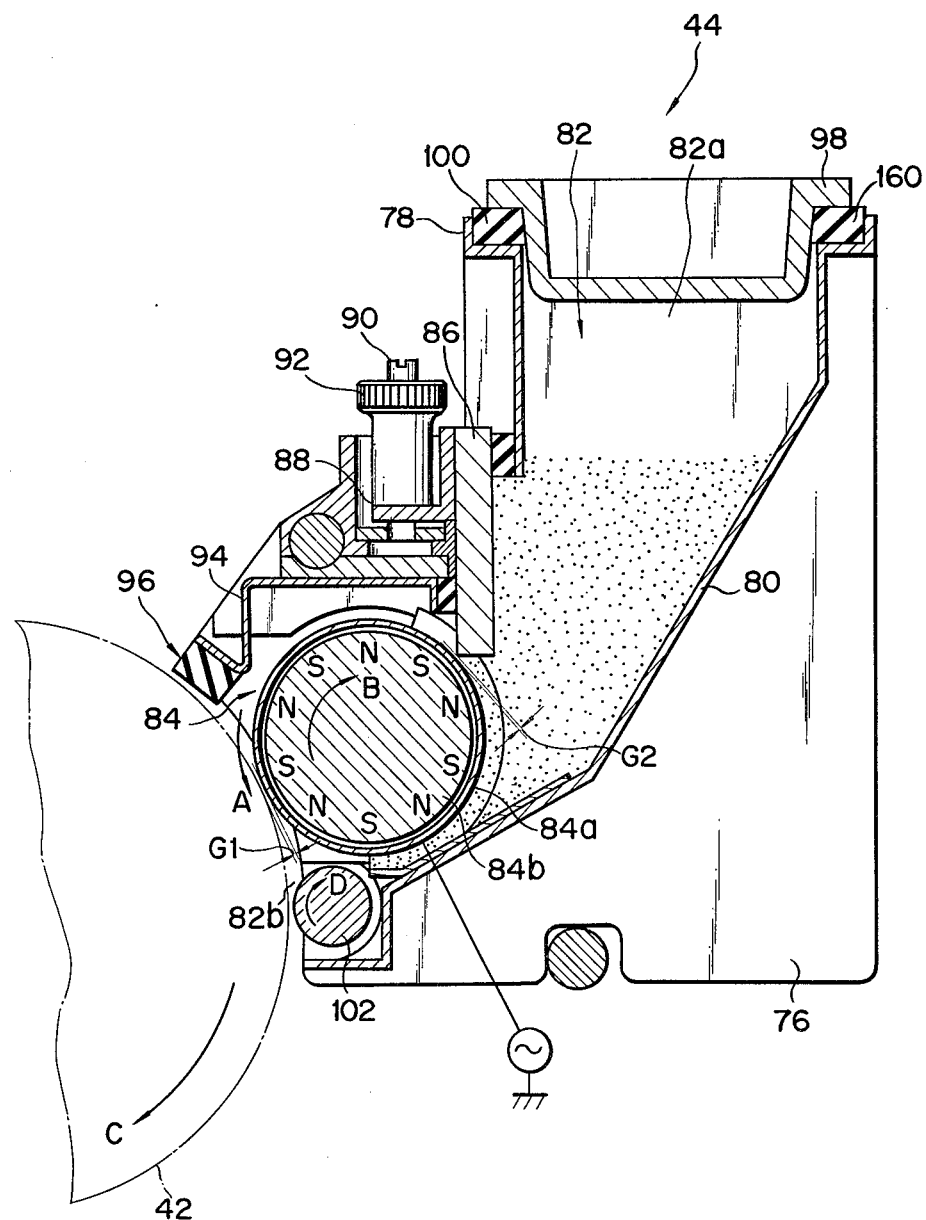
FIG. 10 is a sectional view of a developing device according to a first embodiment of the present invention.

FIG. 10 shows the detailed construction of the developing device 44. Referring to FIG. 10, reference numeral 76 denotes a pair of side frames of the developing device 44. First and second casings 78 and 80 are disposed between the side frames 76. The ends of the first and second casings 78 and 80 are integrally fixed to the side frames 76, respectively. The pair of side frames 76 and the first and second casings 78 and 80 constitute a toner hopper 82 having a supply opening 82a and a developing opening 82b. A developing roller 84 used as a developing means is disposed in the toner hopper 82, partially exposed through the developing opening 82b.

The magnetic toner supplied through the supply opening 82a is stored in the toner hopper 82.

The developing roller 84 comprises a cylindrical rotor (hereinafter referred to as sleeve) 84a made of a nonmagnetic material such as aluminum and SUS, and a magnet roller 84b disposed along the inner space of the sleeve 84a. When the sleeve 84a is rotated by a proper means in the direction indicated by arrow A (counterclockwise in FIG. 10), the magnet roller 84b is rotated in the direction of arrow B (clockwise in FIG. 10). A predetermined small gap G1 is formed between the outer surface of the sleeve 84a and the outer surface of the photosensitive drum 42, which later is rotated as indicated by arrow C (clockwise in FIG. 10). The magnetic toner within the toner hopper 82 is attracted to the outer surface of the sleeve 84a through the magnetic force of the magnet roller 84b and is conveyed in the direction indicated by arrow A in FIG. 10.

A doctor blade 86 is mounted at the lower end of the first casing 78 to control the thickness of the toner layer on the sleeve 84a. When the toner layer passes through a predetermined gap G2 formed between the doctor blade 86 and the sleeve 84a, a uniform toner layer is formed on the sleeve 84a. The doctor blade 86 is formed integrally with a doctor blade adjusting bracket 88. The position of the bracket 88 is adjusted by a doctor adjusting screw 90 to have the predetermined gap G2. Thereafter, the doctor blade 86 is fixed at this preset position by a doctor blade fixing nut 92.

A toner scattering prevention cover 94 is mounted above the opening 82b through a seal 96. A cap 98 is mounted at the opening 82a through a seal 100. A submagnet roller 102 as a magnet member is disposed below the opening 82b (i.e., at the downstream side in the rotational direction of the photosensitive drum 42). The submagnet roller 102 is rotated in the direction of arrow D (clockwise in FIG. 10) and magnetically attracts the toner particles deposited on the non-image forming portion of the photosensitive drum 42. The attracted toner particles are recovered to the developing roller 84 by the magnetic force of the magnet roller 84b.

Figure 11:
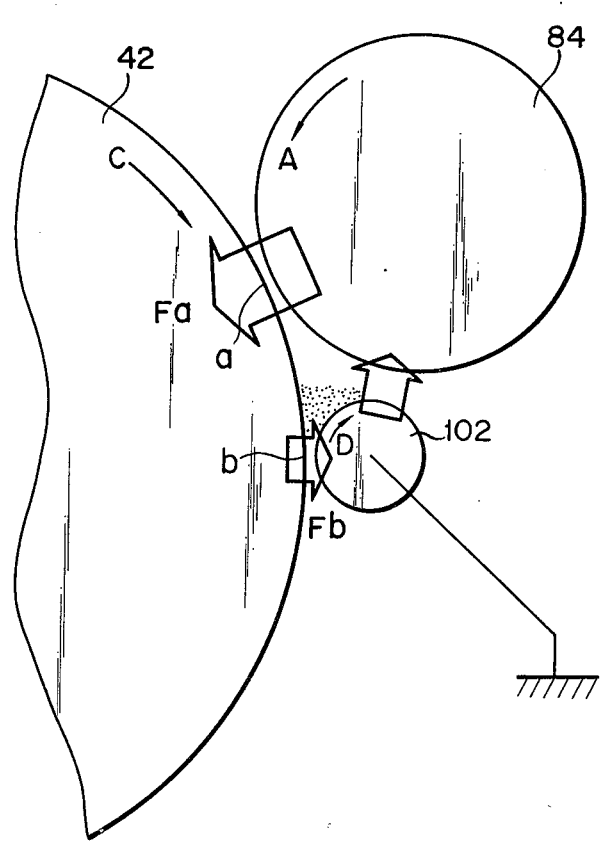
FIG. 11 is a front view showing the flow of a magnetic toner.
Figure 12:
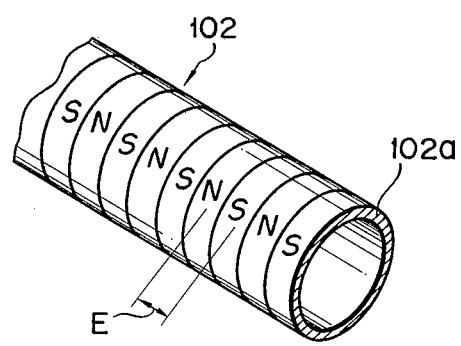
FIG. 12 is a perspective view of a submagnet roller taken out from the developing device shown in FIG. 10.

The submagnet roller 102 comprises thin cylindrical ferrite rubber magnet segments 102a having alternate S and N poles along the axial direction thereof, as shown in FIG. 12. The axis of the submagnet roller 102 is parallel to the axis of the photosensitive drum 42. The magnetic force of the submagnet roller 102 is set to be weaker than that of the developing roller 84. More particularly, as shown in FIG. 11, if a magnetic force at point a (opposing the developing roller 84) of the surface of the photosensitive drum 42 is given as Fa, and a magnetic force at point b (opposing the submagnet roller 102) of the photosensitive drum 42 is given as Fb, an inequality Fa>Fb is given. The photosensitive drum 42 and the submagnet roller 102 are disposed relative to the submagnet roller 102 so as to form predetermined gaps with the developing roller 84, in order to transfer the toner from the submagnet roller 102 to the developing roller 34 when the developing toner layer has reached a predetermined thickness. Thus, unnecessary developing agent deposited on the submagnet roller 102 is not brought into contact with the surface of the photosensitive drum 42. A pitch E between adjacent S and N poles of the submagnet roller 102 is preset to be 10 mm or less. The submagnet roller 102 is grounded.

The conveyance direction of the unnecessary developing agent conveyed by the submagnet roller 102 is the same as that of the developing agent conveyed by the developing roller 84. The conveyance direction of the unnecessary developing agent conveyed by the submagnet roller 102 is opposite to the travel direction of the photosensitive drum 42.

In this manner, the magnetic toner attracted by the developing device 44 to the sleeve 84a is uniformly formed as a layer by the doctor blade 86. Upon rotation of the magnet roller 84b, the magnetic toner of a soft brush shape is conveyed and is attracted to that surface portion of the photosensitive drum 42 through the gap G2 which has an electrostatic latent image.

In the developing process, part of the toner attracted to the trailing end of the image-forming portion extends to the non-image-forming portion, thereby giving rise to the trail phenomenon. However, according to this embodiment, this unnecessary toner is attracted and removed by the magnetic force of the submagnet roller 102. The toner attracted to the image-forming portion can not be removed because a sufficiently strong magnetic force is applied to the image-forming portion as compared with the force applied to the non-image-forming portion. As a result, fog and smearing can be eliminated, so that a clear image having good quality can be obtained as a whole. Furthermore, since the submagnet roller 102 has the alternate S and N poles along the axial direction thereof, the submagnet roller 102 does not magnetically interfere with the magnet roller 84b inside the developing roller 84, thereby preventing nonuniform density and misalignment of the image which are caused by vibration and changes in load. The magnetic force in the circumferential direction of the submagnet roller 102 is kept substantially constant. Even if the submagnet roller 102 is rotated, the unecessary toner attracted to the photosensitive drum 42 can be uniformly recovered by the magnetic force, thereby preventing irregular recovery. Furthermore, regardless of the direction of rolation of submagnet roller 102, trailing can be prevented. The submagnet roller 102 also recovers toner scattered outside the developing device 44 and prevents toner contamination inside the copying machine.

The submagnet roller 102 is a hollow cylindrical, made by rolling sheet-like ferrite rubber magnet segments 102a in a cylindrical shape, thereby readily obtaining magnetization having alternate N and S poles along the axial direction of the submagnet roller 102. Furthermore, the ferrite rubber magnet segment 102a is very soft and hardly damages the photosensitive drum 42 even if the ferrite rubber magnet segment 102a is brought into contact with the photosensitive drum 42. The material of the submagnet roller 102 is not limited to the ferrite rubber magnet, but may be any soft material which will not damage the photosensitive drum 42. For example, a magnet obtained by adding a magnetic material to a resin such as a plastic may be used in place of the ferrite rubber magnet. Furthermore, since the magnetic force of the submagnet roller 102 acting on the surface of the photosensitive drum 42 is weaker than that of the developing roller 84, the unnecessary toner attracted to the non-image-forming portion of the photosensitive drum 42 can be properly recovered. When the toner attracted by the submagnet roller 102 has reached a predetermined amount, it is transferred to the developing roller 84. Therefore, the toner attracted to the submagnet roller 102 will not contact the photosensitive drum 42 and will not distort the image thereon. On the other hand, when the toner has been transferred to the developing roller 84, the toner can be used again as the developing agent. The pitch E between the adjacent S and N poles of the submagnet roller 102 is as small as 10 mm or less, so that the attraction effect of the toner is not locally concentrated. Therefore, the thickness of the toner layer on the submagnet roller 102 can be made thin, in addition to preventing irregular recovery of the unnecessary toner.

If the toner on the submagnet roller 102 contacts the surface of the photosensitive drum 42, the toner image on the photosensitive drum 42 may be distorted. In order to prevent this, a gap between the submagnet roller 102 and the photosensitive drum 42 must be formed larger than the thickness of the toner layer. However, if the gap is large, a strong magnetic force is required in the submagnet roller 102. If the magnetic force therein is strong, it is difficult to transfer the recovered toner to another member (e.g., the developing roller), and it is therefore preferred that the gap be small. For this purpose, the toner layer must be made thin. Since the submagnet roller 102 is grounded, charge is induced at that portion of the submagnet roller 102 which opposes the electrostatic latent image of the photosensitive drum 42. The toner recovery magnetic force and a force acting to attract the charged toner to the latent image are applied to the toner attracted to the latent image (i.e., the image-forming portion developed by the developing roller 84) in the same manner as in the developing roller 84. Therefore, when the submagnet roller 102 is not grounded, the toner on the image-forming portion will be recovered improperly. Therefore, a decrease in image density caused by the submagnet roller 102 does not substantially occur.

When the submagnet roller 102 is not grounded, the latent image on the photosensitive drum 42 will not be developed by the submagnet roller 102 (i.e., the toner will not be charged and is not subject to development). Only the magnetic force from the image developed by the developing roller 84 acts to attract the toner. Therefore, when the unnecessary toner (toner attracted on a portion which does not correspond to the latent image) on the photosensitive drum 42 can be recovered, the toner in the toner image may also be recovered. In this manner, the magnetic force of the submagnet roller 102 and the distance between the submagnet roller 102 and the photosensitive drum 42 are limited to a narrow range, respectively.

Since the submagnet roller 102 is made of a rubber or plastic magnet, the submagnet roller 102 may not be substantially grounded. When the Gauss value and the position of the submagnet roller 102 are properly determined, the unnecessary toner can be properly recovered without decreasing the image density even if the submagnet roller 102 is not grounded. However, the submagnet roller 102 is preferably grounded to widen the ranges of the Gauss value and the position of the submagnet roller 102 relative to the photosensitive drum 42. The travel direction of the submagnet roller 102 matches the toner convey direction of the developing roller 84, so that the unnecessary toner recovered from the photosensitive drum 42 is immediately placed in a magnetic field of the developing roller 84. The toner is thus smoothly recovered by the developing roller 84. Since the rotational direction of the submagnet roller 102 opposes that of the photosensitive drum 42, the toner will not be scattered toward the portion below the developing device 44.

The present invention is not limited to the first embodiment. Various changes and modifications may be made within the spirit and scope of the present invention.

Figure 13:
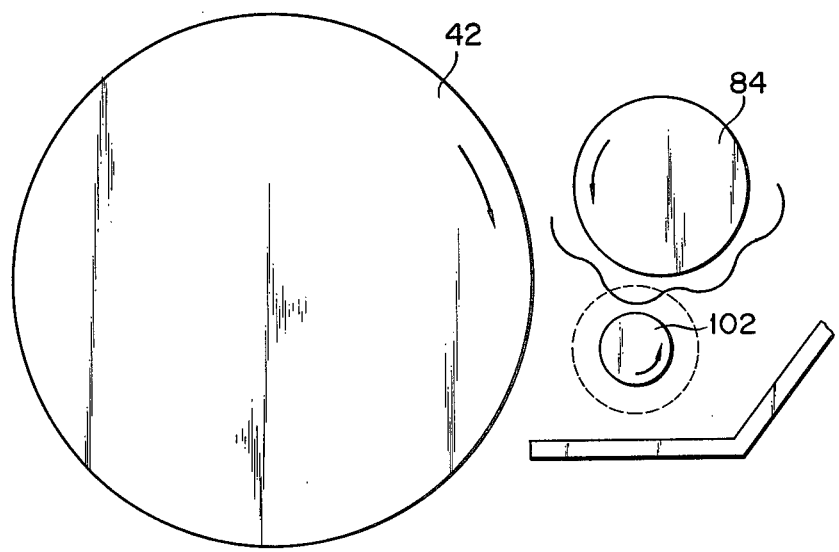
FIG. 13 is a front view schematically showing a developing device according to a second embodiment of the present invention.

A developing device according to a second embodiment of the present invention will be described hereinafter with reference to FIG. 13. The same reference numerals as used in describing the first embodiment denote the same parts of the second embodiment, and a detailed description thereof will be omitted.

In the first embodiment, the travel direction of the submagnet roller 102 is the same as the toner conveyance direction of the developing roller 84. However, as in the second embodiment shown in FIG. 13, the travel direction of the submagnet roller 102 may be opposite to the toner conveyance direction of the developing roller 84. In this case, the scraping effect of the magnetic toner brush of the developing roller 84 acts on the submagnet roller 102 at a region where the toner is transferred to the developing roller 84. The toner attracted to the submagnet roller 102 is scraped therefrom and is properly transferred to the developing roller 84. Therefore, the amount of toner deposited on the submagnet roller 102 does not exceed a predetermined value, so that the toner on the submagnet roller 102 will not contact the surface of the photosensitive drum 42.

Figure 14:
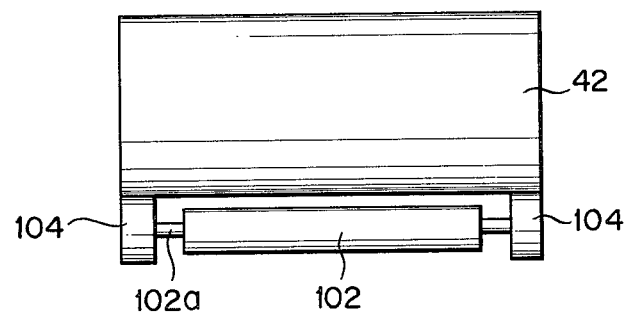
FIG. 14 is a front view of a submagnet roller used in a developing device according to a third embodiment of the present invention.

As a third embodiment shown in FIG. 14, driven guide rollers 104 are mounted at two ends of a rotating shaft 102a of the submagnet roller 102. In this case, the driven guide rollers 104 are brought into contact with a non-image-forming portion of the photosensitive drum 42. The submagnet roller 102 is thus driven upon rotation of the photosensitive drum 42. Without using a special drive mechanism, the submagnet roller 102 is rotated to a point where the recovered toner is transferred to the developing roller 84. The material for the driven guide rollers 104 may be a rigid material such as polyacetal and nylon so as to maintain the gap constant (e.g., 1.0 mm or less) between the submagnet roller 102 and the photosensitive drum 42.

Figure 15:
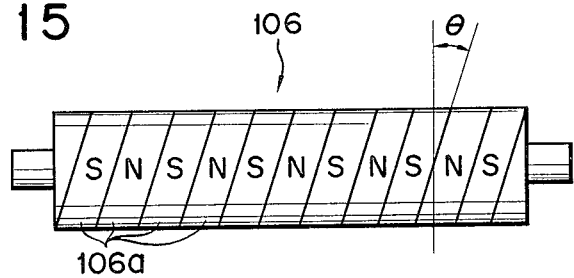
FIG. 15 is a front view of a submagnet roller used in a developing device according to a fourth embodiment of the present invention.

A fourth embodiment of the present invention will be described with reference to FIG. 15. Referring to FIG. 15, reference numeral 106 denotes a submagnet roller constituting a magnet member for removing the unnecessary toner. The submagnet roller 106 has segments 106a each of which has an S or N pole of the alternate S and N poles along the axial direction thereof. Both ends of each segments 16a have faces inclined by an angle $\theta$ with respect to the axis of the submagnet roller 106. The submagnet roller 106 is magnetized as a whole or is obtained by winding a rubber magnet sheet on a roller.

According to the fourth embodiment, the same effect as in the first embodiment is obtained. In addition to this, a magnetized jig can be easily manufactured when the submagnet roller 102 is magnetized as a whole. Alternatively, a rubber magnetic sheet can be easily wound to form the submagnet roller 102.

Figure 16:
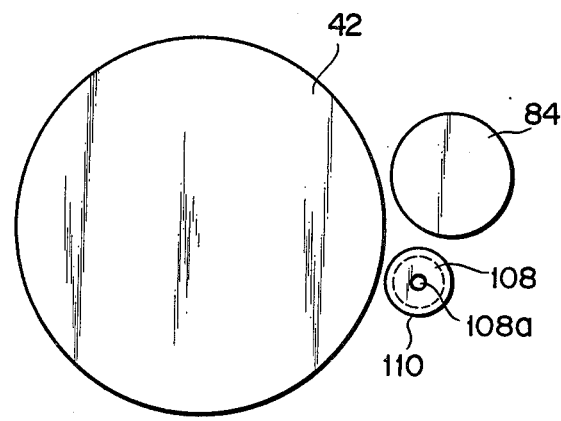
FIGS. 16 and 17 are respectively a side view and a front view of a submagnet roller used in a developing device according to a fifth embodiment of the present invention.
Figure 17:
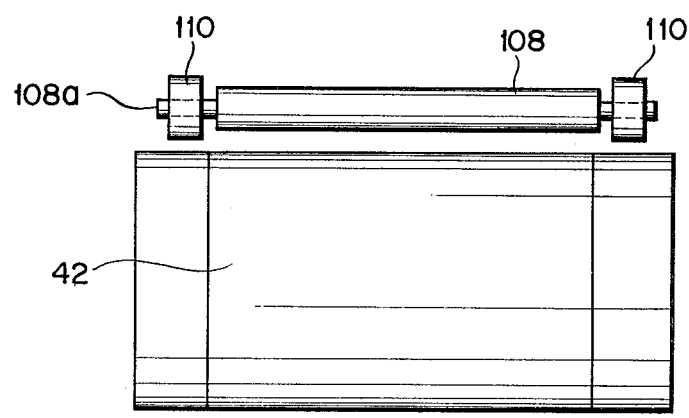

A developing device according to a fifth embodiment of the present invention will be described with reference to FIGS. 16 and 17. Referring to FIGS. 16 and 17, reference numeral 108 denotes a submagnet roller as the magnet member for removing the unnecessary toner particles. Guide rollers 110 are disposed at both ends of a rotating shaft 108a of the submagnet roller 108 so as to be brought into contact with the non-image-forming portion of the photosensitive drum 42. The outer diameter of each guide rollers 110 is slightly larger than that of the submagnet roller 108.

According to the fifth embodiment of the present invention, when the developing device is mounted or demounted, the submagnet roller 108 does not abut against the surface of the photosensitive drum 42, and the submagnet roller 108 will not damage the photosensitive layer of the photosensitive drum 42, thereby safely moving the submagnet roller 108.

Figure 18:
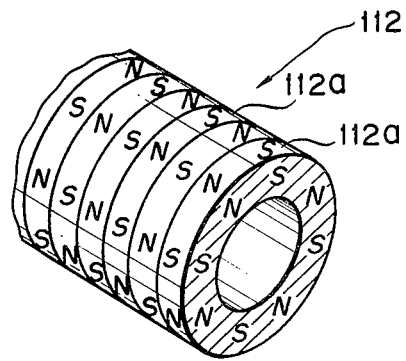
FIG. 18 is a perspective view showing a submagnet roller used in a developing device according to a sixth embodiment of the present invention.
Figure 19:
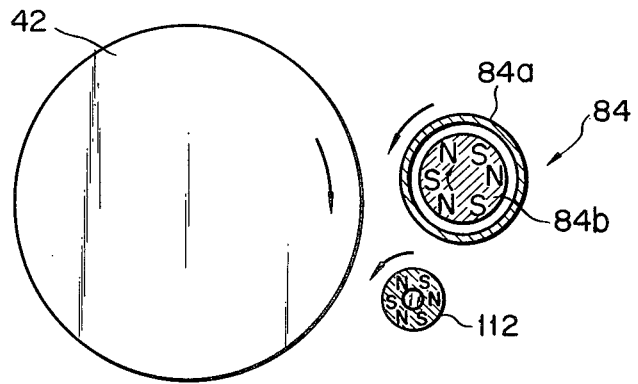
FIG. 19 is a side view schematically showing the developing device according to the sixth embodiment of the present invention.
Figure 20:
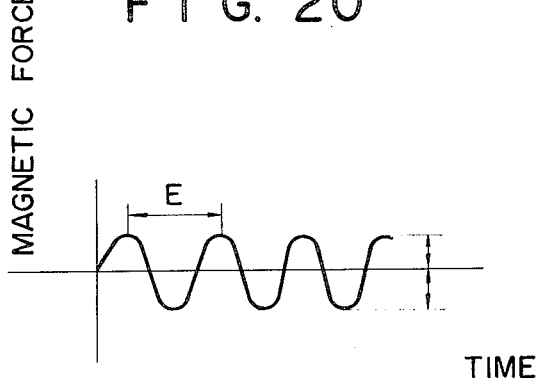
FIG. 20 is a graph showing the magnetic force as a function of time when the submagnet roller is used in the developing device of the sixth embodiment.

A developing device according to a sixth embodiment of the present invention will be described with reference to FIGS. 18 to 20. Referring to FIGS. 18 and 19, reference numeral 112 denotes a submagnet roller as the magnet member for removing the unnecessary toner particles. The submagnet roller 112 has a plurality of axial segments 112a such that alternate S and N poles appear in each of the segments 112a. According to the sixth embodiment, the submagnet roller 112 can be magnetized as a whole or can be formed using a rubber magnet sheet in the same manner as in the magnet roller 84b of the developing roller 84. The submagnet roller 112 and the magnet roller 84b are rotated in opposite directions. If the number of poles and the rotational frequency of the magnet roller 84b are respectively given as N1 and n1, and the number of poles and the rotational frequency of the submagnet roller 112 are respectively given as N2 and n2, the expression $N1 \times n1 = N2 \times n2$ is established. As shown in FIG. 20, the pitch E between the poles and the absolute value of the magnetic force of the magnet roller 84b of the developing roller 84 are substantially constant. At the same time, the pitch E between the poles and the absolute value of the magnetic force of the submagnet roller 112 are substantially constant.

According to the sixth embodiment, the submagnet roller 112 is driven in accordance with the relation $N1 \times n1 = N2 \times n2$, so that the magnetic force of the opposing poles acts in opposite directions for every given period. There is substantially no vibration caused by driving of the submagnet roller 112. Furthermore, since the intensity of the magnetic force of each pole becomes constant, vibration does not occur if the magnetic force by the opposing poles is kept constant. Irregular toner recovery by the submagnet roller 112 does not substantially occur.

Furthermore, according to the sixth embodiment of the present invention, the submagnet roller 112 can be rotated by the magnetic force of the magnet roller 84b. In this manner, no drive source is required to rotate the submagnet roller 112, resulting in simple construction.

When the submagnet roller 112 has a small rotating load, the developing roller 84 and the submagnet roller 112 are rotated in accordance with the relation $N1 \times n1 = N2 \times n2$. However, even when the submagnet roller 112 has a load, the submagnet roller 112 slips in accordance with the load but is still rotated. As a result, the submagnet roller 112 is smoothly rotated in accordance with a relation $N1 \times n1 > N2 \times n2$.

As described above, in the developing device opposing the developed area of the electrostatic latent image-forming surface and having a developing means for conveying the magnetic developing agent by the magnetic force and for supplying the developing agent to the electrostatic latent image-forming surface, the unnecessary toner-removing magnetic member opposes the electrostatic latent image-forming surface past the developed area so as to attract the unnecessary toner particles deposited on the electrostatic latent image-forming surface. Although the developing device has a simple construction, trailing can be prevented, and a clear image having good reproducibility of thin lines can be obtained. The unnecessary toner-removing magnetic member can also collect toner particles scattered outside the developing device, thus preventing contamination inside the copying machine. Furthermore, since the unnecessary toner-removing magnetic member has segments in which the N and S poles alternatively appear, no magnetic interference occurs between the developing member and the unnecessary toner-removing magnetic member. Thus, irregular density and misalignment of the image which is caused by vibration and changes in load are prevented. Furthermore, the magnetic force of the unnecessary toner-removing magnetic member is kept substantially constant, so that the unnecessary toner deposited on the electrostatic latent image-forming surface after development can be recovered by the constant magnetic force. Therefore, nonuniform toner recovery can be prevented.

Furthermore, since the segments are inclined with respect to the axis of the submagnet roller, the submagnet roller can be easily manufactured. When guide members having an outer diameter larger than that of the submagnet roller are mounted at two ends of the submagnet roller, the electrostatic latent image-forming surface will not be damaged. Furthermore, since the relation $N1 \times n1 = N2 \times n2$ is established, where N1 is the number of poles of the magnet roller, n1 is the rotational frequency of the magnet roller, N2 is the number of poles of the submagnet roller and n2 is the rotational frequency of the submagnet roller, the magnet and submagnet rollers can be stably driven, thus eliminating vibration. Finally, since the submagnet roller is driven by the magnetic force of the magnet roller of the developing means, no special drive source for the submagnet roller need be used, resulting in a simple construction.

What is claimed is:

1. A developing device which comprises developing means disposed at a fixed position to oppose an electrostatic latent image-forming surface travelling in one direction, the developing means supplying a magnetic developing agent by a magnetic force to that portion of an electrostatic latent image which opposes the developing means and is defined as a developed area to develop the electrostatic latent image in the developed area by the magnetic developing agent, and a magnetic member disposed to be parallel to the electrostatic latent image-forming surface, to have an axis perpendicular to said one direction, and to oppose the developed area opposing the developing means at a downstream side from the developing means along said one direction, the magnetic member having a plurality of segments such that different magnetic poles thereof alternately appear along the axis of the magnetic member to remove unnecessary particles of the magnetic developing agent which are deposited on that portion of the image-forming surface on which the electrostatic latent image has been developed by the developing means.

2. The developing device according to claim 1, wherein the magnetic member comprises a magnet roller made of a ferrite rubber magnet.

3. The developing device according to claim 1, wherein the magnetic member has a magnetic force smaller than that of the developing means, the magnetic force being applied to the electrostatic latent image-forming surface.

4. The developing device according to claim 3, wherein the magnetic member is disposed in the vicinity of the developing means such that the magnetic developing agent deposited on the magnetic member is transferred to the developing member when the magnetic developing agent has a thickness greater than a predetermined value.

5. The developing device according to claim 1, wherein the different poles of the magnetic member have a pitch E falling within a range $0 < E \leq 10$ mm.

6. The developing device according to claim 1, wherein the magnetic member is grounded.

7. The developing device according to claim 4, wherein the magnetic member has an unnecessary developing agent conveyance direction which is the same as a developing agent conveyance direction of the developing means.

8. The developing device according to claim 4, wherein the magnetic member has an unnecessary developing agent conveyance direction which is opposite to a developing agent conveyance direction of the developing means.

9. The developing device according to claim 4, wherein the magnetic member has an unnecessary developing agent conveyance direction which is opposite to a travel direction of the electrostatic latent image-forming surface.

10. The developing device according to claim 4, wherein the magnetic member has an unnecessary developing agent conveyance direction which is the same as a travel direction of the electrostatic latent image-forming surface.

11. The developing device according to claim 1, wherein each of the segments has two end faces perpendicular to an axis thereof.

12. The developing device according to claim 1, wherein each of the segments has two end faces inclined with respect to an axis thereof.

13. The developing device according to claim 1, wherein the magnet member includes guide members provided at two ends of the magnetic member, each of the guide members having a diameter larger than an outer diameter of the magnetic member.

14. The developing device according to claim 13, wherein the guide members are always spaced apart from the eletrostatic latent image-forming surface.

15. The developing device according to claim 13, wherein the guide members are brought into contact with the electrostatic latent image-forming surface.

16. The developing device according to claim 1, wherein the magnetic member is constituted such that the different poles alternately appear along a circumference thereof.

17. The developing device according to claim 1, wherein the developing means comprises a sleeve and a first magnet roller disposed inside the sleeve, and the magnetic member comprises a second magnet roller, the first and second magnet rollers being rotated in opposite directions so as to substantially equalize $N1 \times n1$ with $N2 \times n2$, where N1 is the number of poles of the first magnet roller, n1 is a rotational frequency of the first magnet roller, N2 is the number of poles of the second magnet roller, and n2 is a rotational frequency of the second magnet roller.

18. The developing device according to claim 17, wherein the first magnet roller has a constant pitch between the poles thereof and a constant absolute value of an intensity of a magnetic force, and the second magnet roller has a constant pitch between the poles thereof and a constant absolute value of an intensity of a magnetic force.

19. The developing device according to claim 18, wherein the second magnet roller comprises a ferrite rubber magnet.

* * * * *